US006978836B2

(12) United States Patent
Nguyen et al.

(10) Patent No.: US 6,978,836 B2
(45) Date of Patent: Dec. 27, 2005

(54) METHODS FOR CONTROLLING WATER AND PARTICULATE PRODUCTION

(75) Inventors: Philip D. Nguyen, Duncan, OK (US); David L. Brown, Temple, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 93 days.

(21) Appl. No.: 10/444,408

(22) Filed: May 23, 2003

(65) Prior Publication Data

US 2004/0231847 A1 Nov. 25, 2004

(51) Int. Cl.$^7$ .......................................... E21B 33/138
(52) U.S. Cl. ................... 166/295; 166/300; 166/305.1; 405/264; 507/220; 507/225; 507/226; 507/233; 523/131
(58) Field of Search .............................. 166/294, 295, 166/305.1, 292, 300; 405/264; 507/219, 507/220, 225, 226, 233; 523/131

(56) References Cited

U.S. PATENT DOCUMENTS

| | | | |
|---|---|---|---|
| 2,238,671 A | 4/1941 | Woodhouse | |
| 2,703,316 A | 3/1955 | Schneider | 260/78.3 |
| 2,869,642 A | 1/1959 | McKay et al. | |
| 3,047,067 A | 7/1962 | Williams et al. | |
| 3,123,138 A * | 3/1964 | Robichaux | 166/295 |
| 3,176,768 A | 4/1965 | Brandt et al. | |
| 3,272,650 A | 9/1966 | MacVittie | 134/7 |
| 3,308,885 A * | 3/1967 | Sandiford | 166/295 |
| 3,316,965 A | 5/1967 | Watanabe | |
| 3,375,872 A | 4/1968 | McLaughlin et al. | |
| 3,415,320 A | 12/1968 | Young | |
| 3,492,147 A | 1/1970 | Young et al. | 117/62.2 |
| 3,659,651 A | 5/1972 | Graham | |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,854,533 A | 12/1974 | Gurley et al. | 166/276 |
| 3,857,444 A * | 12/1974 | Copeland | 166/276 |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | |
| 3,902,557 A * | 9/1975 | Shaughnesy et al. | 166/295 |
| 3,912,692 A | 10/1975 | Casey et al. | 260/78.3 |
| 3,948,672 A | 4/1976 | Harnberger | 106/90 |
| 3,955,993 A | 5/1976 | Curtice | 106/90 |
| 3,960,736 A | 6/1976 | Free et al. | |
| 4,008,763 A | 2/1977 | Lowe et al. | 166/253 |
| 4,029,148 A | 6/1977 | Emery | 166/250.1 |
| 4,031,958 A * | 6/1977 | Sandiford et al. | 166/270 |
| 4,042,032 A | 8/1977 | Anderson et al. | 166/276 |
| 4,070,865 A | 1/1978 | McLaughlin | 61/36 |
| 4,074,760 A | 2/1978 | Copeland et al. | 166/276 |
| 4,169,798 A | 10/1979 | DeMartino | |
| 4,172,066 A | 10/1979 | Zweigle et al. | 260/29.6 TA |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A * | 10/1982 | Canter et al. | 507/229 |
| 4,387,769 A | 6/1983 | Erbstoesser et al. | 166/295 |
| 4,415,805 A | 11/1983 | Fertl et al. | 250/260 |
| 4,439,489 A | 3/1984 | Johnson et al. | 428/404 |
| 4,443,347 A | 4/1984 | Underdown et al. | |
| 4,460,052 A | 7/1984 | Gockel | 175/72 |
| 4,470,915 A | 9/1984 | Conway | |
| 4,493,875 A | 1/1985 | Beck et al. | 428/403 |
| 4,494,605 A | 1/1985 | Wiechel et al. | 166/288 |
| 4,498,995 A | 2/1985 | Gockel | |
| 4,501,328 A | 2/1985 | Nichols | 166/288 |
| 4,526,695 A | 7/1985 | Erbstoesser et al. | |
| 4,527,627 A | 7/1985 | Graham et al. | |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | |
| 4,572,803 A | 2/1986 | Yamazoe et al. | 534/16 |
| 4,649,998 A * | 3/1987 | Friedman | 166/294 |
| 4,664,819 A | 5/1987 | Glaze et al. | |
| 4,665,988 A | 5/1987 | Murphey et al. | 166/295 |
| 4,669,543 A | 6/1987 | Young | 166/276 |
| 4,675,140 A | 6/1987 | Sparks et al. | 264/4.3 |
| 4,683,954 A | 8/1987 | Walker et al. | 166/307 |
| 4,694,905 A | 9/1987 | Armbruster | |

(Continued)

FOREIGN PATENT DOCUMENTS

CA      2063877      5/2003

(Continued)

OTHER PUBLICATIONS

Foreign Search Report and Opinion (PCT Appl. No. GB2004/001842).

(Continued)

*Primary Examiner*—George Suchfield
(74) *Attorney, Agent, or Firm*—Robert A. Kent; Baker Botts

(57) ABSTRACT

The present invention provides methods of reducing the production of both water and particulates from subterranean formations; the methods are particularly useful in conjunction with subterranean formations surrounding wellbores and fractures. The methods comprise the steps of applying to a subterranean formation a pre-flush fluid, applying aqueous surfactant fluid, applying a low-viscosity consolidating fluid, and applying an after-flush fluid.

33 Claims, No Drawings

U.S. PATENT DOCUMENTS

| | | | |
|---|---|---|---|
| 4,715,967 A | 12/1987 | Bellis et al. | |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | |
| 4,787,453 A * | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,072 A * | 6/1989 | Friedman et al. | 166/295 |
| 4,843,118 A | 6/1989 | Lai et al. | 524/555 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/295 |
| 5,107,928 A | 4/1992 | Hilterhaus | 166/293 |
| 5,128,390 A | 7/1992 | Murphey et al. | 523/130 |
| 5,135,051 A | 8/1992 | Facteau et al. | 166/104 |
| 5,142,023 A | 8/1992 | Gruber et al. | 528/354 |
| 5,165,438 A | 11/1992 | Facteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutta et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Csabai et al. | 521/63 |
| 5,232,961 A | 8/1993 | Murphey et al. | 523/414 |
| 5,238,068 A | 8/1993 | Fredrickson | 166/307 |
| 5,247,059 A | 9/1993 | Gruber et al. | 528/354 |
| 5,249,628 A | 10/1993 | Surjaatmadia | |
| 5,256,729 A | 10/1993 | Kutta et al. | 524/700 |
| 5,273,115 A | 12/1993 | Spafford | 166/281 |
| 5,285,849 A * | 2/1994 | Surles et al. | 166/295 |
| 5,293,939 A | 3/1994 | Surles et al. | 166/295 |
| 5,295,542 A | 3/1994 | Cole et al. | 166/278 |
| 5,306,998 A | 4/1994 | Nakamura | 528/12 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | |
| 5,330,005 A | 7/1994 | Card et al. | |
| 5,332,037 A | 7/1994 | Schmidt et al. | 166/276 |
| 5,335,726 A | 8/1994 | Rodrigues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmadja et al. | 175/67 |
| 5,363,916 A | 11/1994 | Himes et al. | 166/276 |
| 5,373,901 A | 12/1994 | Norman et al. | 166/300 |
| 5,381,864 A | 1/1995 | Nguyen et al. | |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | |
| 5,402,846 A | 4/1995 | Jennings, Jr. et al. | 166/259 |
| 5,422,183 A | 6/1995 | Sinclair et al. | 428/408 |
| 5,423,381 A | 6/1995 | Surles et al. | 166/295 |
| 5,439,055 A | 8/1995 | Card et al. | |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,529,123 A | 6/1996 | Carpenter et al. | 166/293 |
| 5,531,274 A | 7/1996 | Bienvenu, Jr. | |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Suries et al. | 166/278 |
| 5,551,514 A | 9/1996 | Nelson et al. | |
| 5,582,249 A | 12/1996 | Caveny et al. | 166/276 |
| 5,582,250 A | 12/1996 | Constien | |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | 507/212.9 |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,670,473 A | 9/1997 | Scepanski | 510/445 |
| 5,697,440 A | 12/1997 | Weaver et al. | 166/281 |
| 5,698,322 A | 12/1997 | Tsai et al. | 428/373 |
| 5,712,314 A * | 1/1998 | Surles et al. | 166/295 |
| 5,732,364 A | 3/1998 | Kalb et al. | 588/8 |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | |
| 5,791,415 A | 8/1998 | Nguyen et al. | |
| 5,799,734 A | 9/1998 | Norman et al. | 166/278 |
| 5,806,593 A | 9/1998 | Suries | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A * | 11/1998 | Jonasson et al. | 166/295 |
| 5,836,392 A | 11/1998 | Urlwin-Smith | 166/295 |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/276 |
| 5,849,401 A | 12/1998 | El-Afandi et al. | 428/215 |
| 5,849,590 A | 12/1998 | Anderson, II et al. | 436/27 |
| 5,853,048 A | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,871,049 A | 2/1999 | Weaver et al. | 166/276 |
| 5,873,413 A | 2/1999 | Chatterji et al. | 166/293 |
| 5,875,844 A | 3/1999 | Chatterji et al. | 166/293 |

| | | |
|---|---|---|
| 5,875,845 A | 3/1999 | Chatterji et al. ............. 166/293 |
| 5,875,846 A | 3/1999 | Chatterji et al. ............. 166/293 |
| 5,893,383 A | 4/1999 | Facteau ........................ 137/14 |
| 5,893,416 A | 4/1999 | Read .......................... 166/304 |
| 5,908,073 A | 6/1999 | Nguyen et al. ............... 166/276 |
| 5,911,282 A | 6/1999 | Onan et al. ..................... 175/72 |
| 5,916,933 A | 6/1999 | Johnson et al. ............... 523/208 |
| 5,921,317 A | 7/1999 | Dewprashad et al. ........ 166/208 |
| 5,924,488 A | 7/1999 | Nguyen et al. |
| 5,929,437 A | 7/1999 | Elliott et al. ................. 250/259 |
| 5,944,105 A | 8/1999 | Nguyen ........................ 166/278 |
| 5,945,387 A | 8/1999 | Chatterji et al. ............. 507/224 |
| 5,948,734 A | 9/1999 | Sinclair et al. ............... 507/219 |
| 5,957,204 A | 9/1999 | Chatterji et al. ............. 166/295 |
| 5,960,880 A | 10/1999 | Nguyen et al. |
| 5,964,291 A | 10/1999 | Bourne et al. ................ 166/279 |
| 5,969,006 A | 10/1999 | Onan et al. ................... 523/166 |
| 5,969,523 A | 10/1999 | Chung et al. ................. 166/278 |
| 5,977,283 A | 11/1999 | Rossitto ........................ 528/44 |
| 5,994,785 A | 11/1999 | Higuchi et al. ............. 527/789 |
| RE36,466 E | 12/1999 | Nelson et al. |
| 6,003,600 A | 12/1999 | Nguyen et al. ............... 166/281 |
| 6,004,400 A | 12/1999 | Bishop et al. ................... 134/2 |
| 6,006,835 A | 12/1999 | Onan et al. ................... 166/295 |
| 6,006,836 A | 12/1999 | Chatterji et al. ............. 166/295 |
| 6,012,524 A | 1/2000 | Chatterji et al. ............. 166/295 |
| 6,016,870 A * | 1/2000 | Dewprashad et al. ........ 166/295 |
| 6,024,170 A | 2/2000 | McCabe et al. ............. 166/300 |
| 6,028,113 A | 2/2000 | Scepanski .................... 514/643 |
| 6,028,534 A | 2/2000 | Ciglenec et al. ......... 340/856.2 |
| 6,040,398 A | 3/2000 | Kinsho et al. ............... 525/527 |
| 6,047,772 A | 4/2000 | Weaver et al. ............... 166/276 |
| 6,059,034 A | 5/2000 | Rickards et al. |
| 6,059,035 A | 5/2000 | Chatterji et al. ............. 166/293 |
| 6,059,036 A | 5/2000 | Chatterji et al. ............. 166/294 |
| 6,068,055 A | 5/2000 | Chatterji et al. ............. 166/293 |
| 6,069,117 A | 5/2000 | Onan et al. ................... 507/202 |
| 6,074,739 A | 6/2000 | Katagiri ........................ 428/323 |
| 6,079,492 A | 6/2000 | Hoogteijling et al. ........ 166/276 |
| 6,098,711 A | 8/2000 | Chatterji et al. ............. 166/294 |
| 6,114,410 A | 9/2000 | Betzold ........................ 523/130 |
| 6,123,871 A | 9/2000 | Carroll .................... 252/301.36 |
| 6,123,965 A | 9/2000 | Jacob et al. ................. 424/489 |
| 6,124,246 A | 9/2000 | Heathman et al. ........... 507/219 |
| 6,130,286 A | 10/2000 | Thomas et al. ............. 524/507 |
| 6,135,987 A | 10/2000 | Tsai et al. .................... 604/365 |
| 6,140,446 A | 10/2000 | Fujiki et al. ................... 528/15 |
| 6,148,911 A | 11/2000 | Gipson et al. ............... 166/248 |
| 6,152,234 A | 11/2000 | Newhouse et al. ......... 166/403 |
| 6,162,766 A | 12/2000 | Muir et al. ................... 507/267 |
| 6,169,058 B1 | 1/2001 | Le et al. ....................... 507/222 |
| 6,172,011 B1 | 1/2001 | Card et al. ................... 507/204 |
| 6,172,077 B1 | 1/2001 | Curtis et al. ................. 514/278 |
| 6,176,315 B1 | 1/2001 | Reddy et al. ................. 166/295 |
| 6,184,311 B1 | 2/2001 | O'Keefe et al. ............. 525/438 |
| 6,187,834 B1 | 2/2001 | Thayer et al. ................. 522/15 |
| 6,189,615 B1 | 2/2001 | Sydansk ....................... 166/270 |
| 6,192,985 B1 | 2/2001 | Hinkel et al. |
| 6,192,986 B1 | 2/2001 | Urlwin-Smith ............. 166/295 |
| 6,196,317 B1 | 3/2001 | Hardy .......................... 166/295 |
| 6,202,751 B1 | 3/2001 | Chatterji et al. ............. 166/276 |
| 6,209,643 B1 | 4/2001 | Nguyen et al. ............... 166/276 |
| 6,209,644 B1 | 4/2001 | Brunet ......................... 166/297 |
| 6,209,646 B1 | 4/2001 | Reddy et al. ................. 166/300 |
| 6,210,471 B1 | 4/2001 | Craig ...................... 106/31.08 |
| 6,214,773 B1 | 4/2001 | Harris et al. ................. 507/271 |
| 6,231,664 B1 | 5/2001 | Chatterji et al. ............. 106/724 |
| 6,234,251 B1 | 5/2001 | Chatterji et al. ............. 166/295 |
| 6,238,597 B1 | 5/2001 | Yim et al. .................... 252/512 |
| 6,241,019 B1 | 6/2001 | Davidson et al. ........... 166/249 |
| 6,242,390 B1 | 6/2001 | Mitchell et al. ............. 507/211 |
| 6,244,344 B1 | 6/2001 | Chatterji et al. ............. 166/295 |
| 6,257,335 B1 | 7/2001 | Nguyen et al. |
| 6,260,622 B1 | 7/2001 | Blok et al. ................. 166/305.1 |
| 6,271,181 B1 | 8/2001 | Chatterji et al. ............. 507/219 |
| 6,274,650 B1 | 8/2001 | Cui ............................. 523/457 |
| 6,279,652 B1 | 8/2001 | Chatterji et al. ............. 166/194 |
| 6,279,656 B1 | 8/2001 | Sinclair et al. ............... 166/310 |
| 6,283,214 B1 | 9/2001 | Guinot et al. ................ 166/297 |
| 6,311,773 B1 | 11/2001 | Todd et al. ................... 166/280 |
| 6,321,841 B1 | 11/2001 | Eoff et al. .................... 166/281 |
| 6,323,307 B1 | 11/2001 | Bigg et al. ................... 528/354 |
| 6,326,458 B1 | 12/2001 | Gruber et al. ............... 528/354 |
| 6,328,105 B1 | 12/2001 | Betzold |
| 6,328,106 B1 | 12/2001 | Griffith et al. ............... 166/295 |
| 6,330,916 B1 | 12/2001 | Rickards et al. |
| 6,330,917 B2 | 12/2001 | Chatterji et al. ............. 166/295 |
| 6,350,309 B2 | 2/2002 | Chatterji et al. ............. 106/677 |
| 6,357,527 B1 | 3/2002 | Norman et al. ............. 166/300 |
| 6,364,018 B1 | 4/2002 | Brannon et al. .......... 166/280.2 |
| 6,364,945 B1 | 4/2002 | Chatterji et al. ............. 106/677 |
| 6,367,165 B1 | 4/2002 | Huttlin ........................ 34/582 |
| 6,367,549 B1 | 4/2002 | Chatterji et al. ............. 166/292 |
| 6,372,678 B1 | 4/2002 | Youngman et al. .......... 504/128 |
| 6,376,571 B1 | 4/2002 | Chawla et al. ................. 522/64 |
| 6,387,986 B1 | 5/2002 | Moradi-Araghi et al. ... 523/211 |
| 6,390,195 B1 | 5/2002 | Nguyen et al. ............... 166/276 |
| 6,401,817 B1 | 6/2002 | Griffith et al. ............... 166/295 |
| 6,405,797 B2 | 6/2002 | Davidson et al. ........... 166/249 |
| 6,406,789 B1 | 6/2002 | McDaniel et al. ........... 428/403 |
| 6,408,943 B1 | 6/2002 | Schultz et al. ............... 166/285 |
| 6,422,314 B1 | 7/2002 | Todd et al. ................... 166/312 |
| 6,439,309 B1 | 8/2002 | Matherly et al. ............ 166/276 |
| 6,439,310 B1 | 8/2002 | Scott III et al. |
| 6,440,255 B1 | 8/2002 | Kohlhammer et al. ....... 156/283 |
| 6,446,727 B1 | 9/2002 | Zemlak et al. |
| 6,448,206 B1 | 9/2002 | Griffith et al. ............... 507/219 |
| 6,450,260 B1 | 9/2002 | James et al. ................. 166/277 |
| 6,454,003 B1 | 9/2002 | Chang et al. ................. 166/270 |
| 6,458,885 B1 | 10/2002 | Stengel et al. ............... 524/507 |
| 6,485,947 B1 | 11/2002 | Rajgarhia et al. ............ 435/139 |
| 6,488,091 B1 | 12/2002 | Weaver et al. ............... 166/300 |
| 6,488,763 B2 | 12/2002 | Brothers et al. ............. 106/692 |
| 6,494,263 B2 | 12/2002 | Todd .......................... 166/312 |
| 6,503,870 B2 | 1/2003 | Griffith et al. ............... 507/219 |
| 6,508,305 B1 | 1/2003 | Brannon et al. ............. 166/293 |
| 6,527,051 B1 | 3/2003 | Reddy et al. ................. 166/300 |
| 6,528,157 B1 | 3/2003 | Hussain et al. ............. 428/325 |
| 6,531,427 B1 | 3/2003 | Shuchart et al. ............. 507/267 |
| 6,538,576 B1 | 3/2003 | Schultz et al. ........... 340/859.6 |
| 6,543,545 B1 | 4/2003 | Chatterji et al. ............. 166/381 |
| 6,552,333 B1 | 4/2003 | Storm et al. ............... 250/269.3 |
| 6,554,071 B1 | 4/2003 | Crook et al. ................. 166/293 |
| 6,555,507 B2 | 4/2003 | Chatterji et al. ............. 507/219 |
| 6,569,814 B1 | 5/2003 | Brady et al. ................. 507/201 |
| 6,582,819 B2 | 6/2003 | McDaniel et al. ........... 428/402 |
| 6,593,402 B2 | 7/2003 | Chatterji et al. ............... 524/7 |
| 6,599,863 B1 | 7/2003 | Palmer et al. ............... 507/219 |
| 6,608,162 B1 | 8/2003 | Chiu et al. ................... 528/129 |
| 6,616,320 B2 | 9/2003 | Huber et al. ............. 366/156.2 |
| 6,620,857 B2 | 9/2003 | Valet ............................. 522/42 |
| 6,626,241 B2 | 9/2003 | Nguyen ....................... 166/278 |
| 6,632,527 B1 | 10/2003 | McDaniel et al. ........... 428/402 |
| 6,632,892 B2 | 10/2003 | Rubinsztajn et al. ........ 525/476 |
| 6,642,309 B2 | 11/2003 | Komitsu et al. ............. 525/100 |
| 6,648,501 B2 | 11/2003 | Huber et al. ................. 366/301 |
| 6,659,179 B2 | 11/2003 | Huber et al. ................. 166/227 |
| 6,664,343 B2 | 12/2003 | Narisawa et al. ............ 525/474 |
| 6,667,279 B1 | 12/2003 | Hessert et al. ............... 507/225 |
| 6,668,926 B2 | 12/2003 | Nguyen et al. |
| 6,669,771 B2 | 12/2003 | Tokiwa et al. ............ 106/162.7 |
| 6,681,856 B1 | 1/2004 | Chatterji et al. ............. 166/294 |
| 6,686,328 B1 | 2/2004 | Binder ......................... 510/446 |
| 6,710,019 B1 | 3/2004 | Sawdon et al. .............. 507/136 |
| 6,713,170 B1 | 3/2004 | Kaneko et al. .............. 428/323 |
| 6,725,926 B2 | 4/2004 | Nguyen et al. ............. 166/254.1 |

| | | | |
|---|---|---|---|
| 6,725,931 B2 | 4/2004 | Nguyen et al. | 166/280.2 |
| 6,729,404 B2 | 5/2004 | Nguyen et al. | 166/280.2 |
| 6,732,800 B2 | 5/2004 | Acock et al. | |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,766,858 B2 | 7/2004 | Nguyen et al. | 166/300 |
| 6,776,236 B1 | 8/2004 | Nguyen | 166/279 |
| 6,832,650 B2 | 12/2004 | Nguyen et al. | 166/279 |
| 6,851,474 B2 | 2/2005 | Nguyen | 166/279 |
| 6,887,834 B2 | 5/2005 | Nguyen et al. | 507/221 |
| 2001/0016562 A1 | 8/2001 | Muir et al. | 507/201 |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2003/0006036 A1 | 1/2003 | Malone et al. | 166/250.12 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0131999 A1 | 7/2003 | Nguyen et al. | |
| 2003/0148893 A1 | 8/2003 | Lungofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nguyen et al. | |
| 2003/0196805 A1 | 10/2003 | Boney et al. | |
| 2003/0205376 A1 | 11/2003 | Ayoub et al. | 166/254.2 |
| 2003/0230408 A1 | 12/2003 | Acock et al. | 166/297 |
| 2003/0234103 A1 | 12/2003 | Lee et al. | 166/293 |
| 2004/0000402 A1 | 1/2004 | Nguyen et al. | |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040713 A1 | 3/2004 | Nguyen et al. | 166/295 |
| 2004/0048752 A1 | 3/2004 | Nguyen et al. | 507/269 |
| 2004/0055747 A1 | 3/2004 | Lee | 166/278 |
| 2004/0106525 A1 | 6/2004 | Willbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0177961 A1 | 9/2004 | Nguyen et al. | 166/280.2 |
| 2004/0194961 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256099 A1 | 12/2004 | Nguyen et al. | 166/249 |
| 2004/0261995 A1 | 12/2004 | Nguyen et al. | 166/279 |
| 2004/0261997 A1 | 12/2004 | Nguyen et al. | 166/281 |
| 2005/0000731 A1 | 1/2005 | Nguyen et al. | 175/57 |
| 2005/0006093 A1 | 1/2005 | Nguyen et al. | 166/281 |
| 2005/0006096 A1 | 1/2005 | Nguyen et al. | 166/295 |
| 2005/0045326 A1 | 3/2005 | Nguyen | 166/278 |

FOREIGN PATENT DOCUMENTS

| | | | |
|---|---|---|---|
| EP | 0313243 B1 | 10/1988 | |
| EP | 0528595 A1 | 8/1992 | |
| EP | 0510762 A2 | 11/1992 | |
| EP | 0643196 A2 | 6/1994 | |
| EP | 0834644 A2 | 4/1998 | |
| EP | 0853186 A2 | 7/1998 | |
| EP | 0 864 726 A2 | 9/1998 | |
| EP | 0879935 B1 | 11/1998 | |
| EP | 0933498 A1 | 8/1999 | |
| EP | 1001133 A1 | 5/2000 | |
| EP | 1132569 A2 | 9/2001 | |
| EP | 1326003 A1 | 7/2003 | |
| EP | 1 396 606 A2 | 3/2004 | |
| EP | 1 403 466 A2 | 3/2004 | |
| EP | 1394355 A1 | 3/2004 | |
| EP | 1398640 A1 | 3/2004 | E21B 43/267 |
| EP | 1464789 A1 | 10/2004 | |
| GB | 1292718 | 10/1972 | C05G 3/00 |
| GB | 2382143 A | 4/2001 | |
| WO | WO 93/15127 | 8/1993 | |
| WO | WO 94/07949 | 4/1994 | |
| WO | WO 94/08078 | 4/1994 | |
| WO | WO 94/08090 | 4/1994 | |
| WO | WO 95/09879 | 4/1995 | |
| WO | WO 97/11845 | 4/1997 | |
| WO | WO 99/27229 | 9/1999 | |
| WO | WO 01/81914 | 11/2001 | |
| WO | WO 01/87797 A1 | 11/2001 | |
| WO | WO 02/12674 A1 | 2/2002 | |
| WO | WO 03/027431 A1 | 4/2003 | |
| WO | WO04/037946 A1 | 5/2004 | |
| WO | WO 04/038176 A1 | 5/2004 | |
| WO | WO 05/021928 A2 | 2/2005 | E21B 33/138 |

OTHER PUBLICATIONS

U.S. Appl. No. 10/383,154, filed Mar. 3, 2003, Nguyen et al.
U.S. Appl. No. 10/394,898, filed Mar. 21, 2003, Eoff et al.
U.S. Appl. No. 10/408,800, filed Apr. 7, 2003, Nguyen et al.
U.S. Appl. No. 10/601,407, filed Jun. 23, 2003, Byrd et al.
U.S. Appl. No. 10/603,492, filed Jun. 25, 2003, Nguyen et al.
U.S. Appl. No. 10/649,029, filed Aug. 27, 2003, Nguyen et al.
U.S. Appl. No. 10/650,063, filed Aug. 26, 2003, Nguyen.
U.S. Appl. No. 10/650,064, filed Aug. 26, 2003, Nguyen et al.
U.S. Appl. No. 10/650,065, filed Aug. 26, 2003, Nguyen.
U.S. Appl. No. 10/659,574, filed Sep. 10,2003, Nguyen et al.
U.S. Appl. No. 10/727,365, filed Dec. 4, 2003, Reddy et al.
U.S. Appl. No. 10/751,593, filed Jan. 5, 2004, Nguyen.
U.S. Appl. No. 10/775,347, filed Feb. 10, 2004, Nguyen.
U.S. Appl. No. 10/791,944, filed Mar. 3,2004, Nguyen.
U.S. Appl. No. 10/793,711, filed Mar. 5, 2004, Nguyen et al.
U.S. Appl. No. 10/852,811, filed May 25, 2004, Nguyen.
U.S. Appl. No. 10/853,879, filed May 26, 2004, Nguyen et al.
U.S. Appl. No. 10/860,951, filed Jun. 4, 2004, Stegent et al.
U.S. Appl. No. 10/861,829, filed Jun. 4, 2004, Stegent et al.
U.S. Appl. No. 10/862,986, filed Jun. 8, 2004, Nguyen et al.
U.S. Appl. No. 10/864,061, filed Jun. 9, 2004, Blauch et al.
U.S. Appl. No. 10/864,618, filed Jun. 9, 2004, Blauch et al.
U.S. Appl. No. 10/868,593, filed Jun. 15, 2004, Nguyen et al.
U.S. Appl. No. 10/868,608, filed Jun. 15, 2004, Nguyen et al.
U.S. Appl. No. 10/937,076, filed Sep. 9, 2004, Nguyen et al.
U.S. Appl. No. 10/944,973, filed Sep. 20, 2004, Nguyen et al.
U.S. Appl. No. 10/972,648, filed Oct. 25, 2004, Dusterhoft et al.
U.S. Appl. No. 10/977,673, filed Oct. 29, 2004, Nguyen.
U.S. Appl. No. 11/009,277, filed Dec. 8,2004, Welton et al.
U.S. Appl. No. 11/011,394, filed Dec. 12, 2004, Nguyen et al.
U.S. Appl. No. 11/035,833, filed Jan. 14, 2005, Nguyen.
U.S. Appl. No. 11/049,252, filed Feb. 2, 2005, Van Batenburg et al.
U.S. Appl. No. 11/053,280, filed Feb. 8, 2005, Nguyen.
U.S. Appl. No. 11/056,635, filed Feb. 11, 2005, Dusterhoft et al.
Halliburton, *CoalStim*[SM] *Service, Helps Boost Cash Flow From CBM Assets*, Stimulation, HO3679 Oct. 3, 2003, Halliburton Communications.

Halliburton, *Conductivity Endurance Technology For HIgh Permeability Reservoirs, Helps Prevent Intrusion of Formation Material Into the Proppant Pack for Improved Long-term Production*, Stimulation, 2003, Halliburton Communications.

Halliburton, *Expedite™ Service, A Step-Change Improvement Over Conventional Proppant Flowback Control Systems. Provides Up to Three Times the Conductivity of RCPs.*, Stimulation, HO3296 May, 4, 2004, Halliburton Communications.

Halliburton Technical Flier—Multi Stage Frac Completion Methods, 2 pages.

Halliburton *"CobraFrac$^{SM}$ Service, Coiled Tubing Fracturing—Cost-Effective Method for Stimulating Untapped Reserves"*, 2 pages.

Halliburton *"CobraJetFrac$^{SM}$ Service, Cost-Effective Technology That Can Help Reduce Cost per BOE Produced, Shorten Cycle time and Reduce Capex"*.

Halliburton Cobra Frac Advertisement.

Halliburton *"SurgiFrac$^{SM}$ Service, a Quick and cost-Effective Method to Help Boost Production From Openhole Horizonal Completions"*.

Halliburton, *SandWedge® NT Conductivity Enhancement System, Enhances Proppant Pack Conductivity and Helps Prevent Intrusion of Formation Material for Improved Long-Term Production*, Stimulation, HO2289 May 4, 2004, Halliburton Communications.

Almond et al., *Factors Affecting Proppant Flowback With Resin Coated Proppants*, SPE 30096, pp. 171-186.

Nguyen et al., *A Novel Approach For Enhancing Proppant Consolidation: Laboratory Testing And Field Applications*, SPE Paper No. 77748.

SPE 15547, *Field Application of Lignosulfonate Gels To Reduce Channeling*, South Swan Hills Miscible Unit, Alberta, Canada, by O.R. Wagner et al.

Owens et al., *Waterflood Pressure Pulsing for Fractured Reservoirs*SPE 1123.

Felsenthal et al., *Pressure Pulsing—An Improved Method of Waterflooding Fractured Reservoirs*SPE 1788.

Raza, *"Water and Gas Cyclic Pulsing Method for Improved Oil Recovery"*, SPE 3005.

Peng et al., *"Pressure Pulsing Waterflooding in Dual Porosity Naturally Fractured Reservoirs"* SPE 17587.

Dusseault et al, *"Pressure Pulse Workovers in Heavy Oil"*, SPE 79033.

Yang et al., *"Experimental Study on Fracture Initiation By Pressure Pulse"*, SPE 63035.

Nguyen et al., *New Guidelines For Applying Curable Resin-Coated Proppants*, SPE Paper No. 39582.

Kazakov et al., *"Optimizing and Managing Coiled Tubing Frac Strings"* SPE 60747.

Advances in Polymer Science, vol. 157, *"Degradable Aliphatic Polyesters"* edited by A.-C. Alberston.

Gorman, *Plastic Electric: Lining up the Future of Conducting Polymers*Science News, vol. 163.

Gidley et al., *"Recent Advances in Hydraulic Fracturing,"* Chapter 6, pp. 109-130.

Simmons et al., *"Poly(Phenyllactide): Synthesis, Characterization, and Hydrolytic Degradation, Biomacromolecules"*, vol. 2, No. 2, pp. 658-663.

Yin et al., *"Preparation and Characterization of Substituted Polylactides"*, Americal Chemical Society, vol. 32, No. 23, pp. 7711-7718.

Yin et al., *"Synthesis and Properties of Polymers Derived from Substituted Lactic Acids"*, American Chenical Society, Ch. 12, pp. 147-159.

Cantu et al., *"Laboratory and Field Evaluation of a Combined Fluid-Loss Control Additive and Gel Breaker for Fracturing Fluids,"* SPE 18211.

Love et al., *"Selectively Placing Many Fractures in Openhole Horizontal Wells Improves Production"*, SPE 50422.

McDaniel et al. *"Evolving New Stimulation Process Proves Highly Effective In Leval 1 Dual-Lateral Completion"* SPE 78697.

Albertsson et al., *"Aliphatic Polyesters: Synthesis, Properties and Applications"*, Advances in Polymer Science, vol. 57 Degradable Aliphatic Polyesters.

Dechy-Cabaret et al., *"Controlled Ring-Operated Polymerization of Lactide and Glycolide"* American Chemical Society, Chemical Reviews, A-Z, AA-AD.

Funkhouser et al., *"Synthetic Polymer Fracturing Fluid For High-Temperature Applications"*, SPE 80236.

*Chelating Agents*, Encyclopedia of Chemical Technology, vol. 5 (764-795).

Vichaibun et al., *"A New Assay for the Enzymatic Degradation of Polylactic Acid, Short Report"*, ScienceAsia, vol. 29, pp. 297-300.

CDX Gas, CDX Solution, 2003, CDX, LLC, Availabe @ www.cdxgas.com/solution.html, printed pp 1-2.

CDX Gas, *"What is Coalbed Methane?"* CDX, LLC. Available @ www.cdxgas.com/what.html, printed p. 1.

Halliburton brochure entitled "H2Zero ™ Service Introducint The Next Generation of cost-Effective Conformance Control Solutions".

Halliburton brochure entitled INJECTROL® A Component:.

Halliburton brochure entitled "INJECTROL® G Sealant".

Halliburton brochure entitled "INJECTROL® IT Sealant".

Halliburton brochure entitled "INJECTROL® Service Treatment".

Halliburton brochure entitled "INJECTROL® U Sealant".

Halliburton brochure entitled "Sanfix® A Resin".

Halliburton brochure entitled "Pillar Frac Stimulation Technique" Fracturing Service Technical Data Sheet, 2 pages.

Foreign search report and opinion (CPW 21582 EP).

* cited by examiner

METHODS FOR CONTROLLING WATER AND PARTICULATE PRODUCTION

FIELD OF THE INVENTION

The present invention relates to improved methods for stabilizing unconsolidated regions and for controlling water production from subterranean formations.

DESCRIPTION OF THE PRIOR ART

Hydrocarbon wells are often located in subterranean zones that contain unconsolidated particulates that may migrate out of the subterranean formation with the oil, gas, water, and/or other fluids produced by the wells. The presence of particulates, such as formation sand, in produced fluids is disadvantageous and undesirable in that the particulates may abrade pumping and other producing equipment and reduce the fluid production capabilities of the producing zones. Unconsolidated subterranean zones include those that contain loose particulates and those wherein the bonded particulates have insufficient bond strength to withstand the forces produced by the production of fluids through the zones.

One method of controlling particulates in unconsolidated formations involves placing a filtration bed containing gravel near the wellbore in order to present a physical barrier to the transport of unconsolidated formation fines with the production of hydrocarbons. Typically, such so-called "gravel packing operations" involve the pumping and placement of a quantity of a desired particulate into the unconsolidated formation in an area adjacent to a wellbore. Such packs may be time consuming and expensive to install.

Another method used to control particulates in unconsolidated formations involves consolidating unconsolidated subterranean producing zones into hard permeable masses by applying a resin followed by a spacer fluid and then a catalyst. Such resin application may be problematic when, for example, an insufficient amount of spacer fluid is used between the application of the resin and the application of the external catalyst. The resin may come into contact with the external catalyst in the wellbore itself rather than in the unconsolidated subterranean producing zone. When resin is contacted with an external catalyst an exothermic reaction occurs that may result in rapid polymerization, potentially damaging the formation by plugging the pore channels, halting pumping when the wellbore is plugged with solid material, or resulting in a down hole explosion as a result of the heat of polymerization. Also, using these conventional processes to treat long intervals of unconsolidated regions is not practical due to the difficulty in determining if the entire interval has been successfully treated with both the resin and the external catalyst.

Often, unconsolidated formation sands migrate out of the formation when water is produced from the formation. This is due, in part, to the fact that most natural cementation between formation sand grains disintegrates when in contact with an aqueous moving phase. The production of water from a subterranean producing zone is disadvantageous due to its effect on mobilizing formation sands, and because water production constitutes a major expense in the recovery of hydrocarbons from subterranean formations, especially in light of the energy expended in producing, separating, and disposing of the water.

A variety of methods and techniques have been used to reduce the water permeability of subterranean formations. For example, one such method involves contacting the formation with a treatment solution having dissolved therein a surfactant formed of one or more fatty acid imidazolyl compounds to control the flow of water from the formation. While these methods have achieved moderate success, the treatment solutions can only be injected into the formation a short distance because as the treatment solution exits the wellbore into the subterranean formation it attaches to adsorption sites on surfaces within the pores of the formation. Once the treatment solution is adsorbed onto the surfaces in the formation near the well bore its presence not only blocks the flow of water from the formation, it also blocks the flow of additional treatment solution deeper into the formation. This limits penetration into the formation and the water-producing zone or zones, which limits the reduction in water production achieved.

SUMMARY OF THE INVENTION

The present invention provides improved methods for controlling water production and formation sand migration in subterranean producing zones.

One embodiment of the present invention describes a method of stabilizing a subterranean formation comprising the steps of applying a preflush solution comprising an aqueous liquid and a water-resistant polymer to the subterranean formation, applying an aqueous liquid comprising a surfactant into the subterranean formation, applying a low-viscosity consolidating fluid to the subterranean formation, and applying an afterflush fluid to the subterranean formation.

Another embodiment of the present invention describes a method of reducing the production of particulates and water from a subterranean formation comprising the steps of comprising the steps of applying a preflush solution comprising an aqueous liquid and a water-resistant polymer to the subterranean formation, applying an aqueous liquid comprising a surfactant into the subterranean formation, applying a low-viscosity consolidating fluid to the subterranean formation, and applying an afterflush fluid to the subterranean formation.

Other and further objects, features and advantages of the present invention will be readily apparent to those skilled in the art upon a reading of the description of preferred embodiments which follows.

DESCRIPTION OF PREFERRED EMBODIMENTS

The present invention provides improved methods for controlling water production and preventing the migration of loose and incompetent particulates such as formation sands and fines in subterranean formations.

Certain embodiments of the methods of the present invention comprise successively placing into a subterranean zone a pre-flush fluid, an aqueous surfactant fluid, a low-viscosity consolidating fluid, and an after-flush fluid. Each successive placement of a treatment fluid displaces the previous treatment fluid deeper into the subterranean formation.

The pre-flush fluid comprises an aqueous liquid and one or more water-resistant polymers. The aqueous liquid used may be fresh water, salt water (e.g., water containing one or more salts dissolved therein), brine (e.g., saturated salt water), seawater, or any other aqueous liquid that does not adversely react with the other components utilized in accordance with this invention or with the subterranean formation.

Water-resistant polymers, also known as relative permeability modifiers, act, inter alia, to adsorb onto the surfaces within the pores of a formation to reduce the formation's water permeability. A variety of polymers are suitable for use as the water-resistant polymers in the present invention. Examples of particularly suitable polymers include, but are not limited to, polyacrylamide, hydrolyzed polyacrylamide, xanthan, scleroglucan, polysaccharides, amphoteric polymers made from acrylamide, acrylic acid, and diallyldimethylammonium chloride, vinyl sulfonate/vinyl amide/acrylamide terpolymers, vinyl sulfonate/acrylamide copolymers, acrylamide/acrylamido-methylpropanesulfonic acid copolymers, acrylamide/vinylpyrrolidone copolymers, sodium carboxymethyl cellulose, poly[dialkylaminoacrylate-co-acrylate-g-poly(ethyleneoxide)], acrylamide/octadecyldimethylammoniumethyl methacrylate bromide copolymer, dimethylaminoethyl methacrylate/vinyl pyrrolidone/hexadecyldimethylammoniummethyl methacrylate bromide terpolymer, acrylamide/2-acrylamido-2-methyl propane sulfonic acid/2-ethylhexyl methacrylate terpolymer, and combinations thereof. As used herein "-g-" in a formula means that the immediately following molecule in the formula is grafted to the preceding polymer molecule.

Generally, at least one water-resistant polymer is included in the pre-flush fluid in an amount sufficient to reduce the production of water from the formation. In one embodiment, the water-resistant polymer is included in the pre-flush fluid in the range of from about 0.01% to about 10.0% by weight of the pre-flush fluid. In another embodiment, the water-resistant polymer is included in the pre-flush fluid in the range of from about 0.1% to about 1.0% by weight of the pre-flush fluid. One skilled in the art, with the benefit of this disclosure, will be able to determine the amount of water-resistant polymer sufficient to reduce the production of water from the formation by the desired level.

In the methods of the present invention, after the pre-flush fluid has been placed in the subterranean formation, an aqueous surfactant fluid is placed in the subterranean formation. The aqueous surfactant fluid comprises an aqueous liquid and a surfactant and acts, inter alia, both to displace the pre-flush fluid further into the formation and to prepare the subterranean formation for the later placement of a low-viscosity consolidating fluid. Generally, the volume of aqueous surfactant fluid placed into the subterranean formation is between 1 to 50 times the volume of the pre-flush fluid.

The aqueous liquid component of the aqueous surfactant fluid may be fresh water, salt water, brine, seawater, or any other aqueous liquid that does not adversely react with the other components utilized in accordance with this invention or with the subterranean formation. Any surfactant compatible with the later-used low-viscosity consolidating fluid and capable of facilitating the coating of the consolidating fluid on the subterranean particles and aiding the consolidating fluid in flowing to the contact points between adjacent particulates in the formation may be used in the present invention. Such surfactants include, but are not limited to, ethoxylated nonyl phenol phosphate esters, mixtures of one or more cationic surfactants, one or more non-ionic surfactants, and an alkyl phosphonate surfactant. Suitable mixtures of one or more cationic and nonionic surfactants are described in U.S. Pat. No. 6,311,773 issued to Todd et al. on Nov. 6, 2001, the disclosure of which is incorporated herein by reference. Another suitable surfactant is a benzyl chloride quat of tris-2-4-6-dimethylaminomethyl phenol. The surfactant or surfactants used are included in the aqueous liquid in an amount sufficient to prepare the subterranean formation to receive a treatment of low-viscosity resin by wetting the particulates in the formation so that the resin can attach to those particulates. In some embodiments of the present invention, the aqueous surfactant fluid comprises surfactant in an amount ranging from about 0.1% to about 15% by weight of the aqueous liquid.

According to the methods of the present invention, after the aqueous surfactant fluid has been placed in the subterranean formation, a low-viscosity consolidating fluid is placed in the subterranean formation. Low-viscosity consolidating fluids suitable for use in the present invention generally comprise a hardenable resin component and a solvent component. The low-viscosity consolidating fluids of the present invention may be classified as one of four types: a two-component epoxy-based consolidation fluid comprising a hardenable resin component and a hardening agent component; a furan-based consolidation fluid; a phenolic-based consolidation fluid; or, a high-temperature ("HT") epoxy-based consolidation fluid. In certain embodiments, the low-viscosity consolidating fluid chosen is either activated by an internal activator or by the ambient subterranean temperature such that an external catalyst is not required.

Selection of a low-viscosity consolidating fluid may be related to the temperature of the subterranean formation to which the fluid will be introduced. By way of example and not limitation, for subterranean formations having a bottom hole static temperature ("BHST") ranging from about 60° F. to about 250° F., two-component epoxy-based consolidation fluids comprising a hardenable resin component and a hardening agent component are preferred. For subterranean formations having a BHST ranging from about 300° F. to about 600° F., a one-component furan-based consolidation fluid may be preferred. For subterranean formations having a BHST from about 200° F. to about 400° F., either a one-component phenolic-based consolidation fluid or a one-component HT epoxy-based consolidation fluid is suitable.

Regardless of the type of low-viscosity consolidating fluid chosen, its viscosity should preferably be controlled to ensure that it is able to sufficiently penetrate the unconsolidated portions of the subterranean formation. To achieve the desired level of penetration, the consolidation fluid viscosity is preferably below about 100 cP, more preferably below about 50 cP, and most preferably below about 10 cP. Achieving the desired viscosity will generally involve either the use of a solvent or the use of heat to reduce the viscosity of the chosen resin. Factors that may influence the amount of solvent needed include the geographic location of the well and the surrounding environmental conditions. In some embodiments, suitable consolidating fluid to solvent ratios range from about 1:0.2 to about 1:20. It is within the ability of one skilled in the art, with the benefit of this disclosure, to determine a sufficient amount of a suitable solvent to achieve the desired viscosity and, thus, to achieve the preferred penetration into the subterranean formation.

One low-viscosity consolidating fluid of the present invention is a two-component epoxy-based consolidation fluid comprising a hardenable resin component and a hardening agent component. The hardenable resin component is comprised of a hardenable resin and an optional solvent. The solvent may be added to the resin to reduce its viscosity for ease of handling, mixing and transferring. It is within the ability of one skilled in the art with the benefit of this disclosure to determine if and how much solvent may be needed to achieve a viscosity suitable to the subterranean conditions. Factors that may affect this decision include geographic location of the well and the surrounding weather conditions. An alternate way to reduce the viscosity of the liquid hardenable resin is to heat it. This method avoids the use of a solvent altogether, which may be desirable in certain circumstances. The second component is the liquid hardening agent component, which is comprised of a hardening agent, a silane coupling agent, a surfactant, an optional hydrolyzable ester, and an optional liquid carrier fluid for, inter alia, reducing the viscosity of the liquid hardening agent component. It is within the ability of one skilled in the art with the benefit of this disclosure to determine if and how much liquid carrier fluid is needed to achieve a viscosity suitable to the subterranean conditions.

Examples of hardenable resins that can be utilized in the liquid hardenable resin component include, but are not limited to, organic resins such as bisphenol A-epichlorohydrin resin, polyepoxide resin, novolak resin, polyester resin, phenol-aldehyde resin, urea-aldehyde resin, furan resin, urethane resin, glycidyl ethers and mixtures thereof. Of these, bisphenol A-epichlorohydrin resin is preferred. The resin utilized is included in the liquid hardenable resin component in an amount sufficient to consolidate the coated particulates. In some embodiments of the present invention, the resin utilized is included in the liquid hardenable resin component in the range of from about 70% to about 100% by weight of the liquid hardenable resin component.

Any solvent that is compatible with the hardenable resin and achieves the desired viscosity effect is suitable for use in the present invention. Preferred solvents are those having high flash points (most preferably about 125° F.) because of, inter alia, environmental considerations. As described above, use of a solvent in the hardenable resin composition is optional but may be desirable to reduce the viscosity of the hardenable resin component for a variety of reasons including ease of handling, mixing, and transferring. It is within the ability of one skilled in the art with the benefit of this disclosure to determine if and how much solvent is needed to achieve a suitable viscosity. Solvents suitable for use in the present invention include, but are not limited to: butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene and fatty acid methyl esters. Of these, butylglucidyl ether is preferred.

Examples of the hardening agents that can be utilized in the liquid hardening agent component of the two-component consolidation fluids of the present invention include, but are not limited to, amines, aromatic amines, polyamines, aliphatic amines, cyclo-aliphatic amines, amides, polyamides, 2-ethyl-4-methyl imidazole and 1,1,3-trichlorotrifluoroacetone. Selection of a preferred hardening agent depends, in part, on the temperature of the formation in which the hardening agent will be used. By way of example and not of limitation, in subterranean formations having a temperature from about 60° F. to about 250° F., amines and cyclo-aliphatic amines such as piperidine, triethylamine, N,N-dimethylaminopyridine, benzyldimethylamine, tris(dimethylaminomethyl)phenol, and 2-(N$_2$N-dimethylaminomethyl)phenol are preferred with N,N-dimethylaminopyridine most preferred. In subterranean formations having higher temperatures, 4,4-diaminodiphenyl sulfone may be a suitable hardening agent. The hardening agent utilized is included in the liquid hardening agent component in an amount sufficient to consolidate the coated particulates. In some embodiments of the present invention, the hardening agent used is included in the liquid hardenable resin component in the range of from about 40% to about 60% by weight of the liquid hardening agent component.

The silane coupling agent may be used, inter alia, to act as a mediator to help bond the resin to the sand surface. Examples of silane coupling agents that can be utilized in the liquid hardening agent component of the two-component consolidation fluids of the present invention include, but are not limited to, N-2-(aminoethyl)-3-aminopropyltrimethoxysilane, 3-glycidoxypropyltrimethoxysilane, and n-beta-(aminoethyl)-gamma-aminopropyl trimethoxysilane. Of these, n-beta-(aminoethyl)-gamma-aminopropyl trimethoxysilane is preferred. The silane coupling agent used is included in the liquid hardening agent component in an amount capable of sufficiently bonding the resin to the particulate. In some embodiments of the present invention, the silane coupling agent used is included in the liquid hardenable resin component in the range of from about 0.1% to about 3% by weight of the liquid hardening agent component.

Any surfactant compatible with the liquid hardening agent may be used in the present invention. Such surfactants include, but are not limited to, an ethoxylated nonyl phenol phosphate ester, mixtures of one or more cationic surfactants, and one or more non-ionic surfactants and an alkyl phosphonate surfactant. Another suitable surfactant is a benzyl chloride quat of tris-2-4-6-dimethylaminomethyl phenol. The mixtures of one or more cationic and nonionic surfactants are described in U.S. Pat. No. 6,311,773, issued to Todd et al. on Nov. 6, 2001, which is incorporated herein by reference. The surfactant or surfactants utilized are included in the liquid hardening agent component in an amount in the range of from about 2% to about 15% by weight of the liquid hardening agent component.

Use of a diluent or liquid carrier fluid in the hardenable resin composition is optional and may be used to reduce the viscosity of the hardenable resin component for ease of handling, mixing and transferring. It is within the ability of one skilled in the art, with the benefit of this disclosure, to determine if and how much liquid carrier fluid is needed to achieve a viscosity suitable to the subterranean conditions. Any suitable carrier fluid that is compatible with the hardenable resin and achieves the desired viscosity effects is suitable for use in the present invention. The liquid carrier fluids that can be utilized in the liquid hardening agent component of the two-component consolidation fluids of the present invention preferably include those having high flash points (most preferably above about 125° F.). Examples of liquid carrier fluids suitable for use in the present invention include, but are not limited to, dipropylene glycol methyl ether, dipropylene glycol dimethyl ether, dimethyl formamide, diethyleneglycol methyl ether, ethyleneglycol butyl ether, diethyleneglycol butyl ether, methanol propylene carbonate, d'limonene and fatty acid methyl esters. Of these, dipropylene glycol methyl ether is preferred.

Where the low-viscosity consolidating fluid of the present invention is a furan-based consolidation fluid, suitable furan-based resins include, but are not limited to, furfuryl alcohol, a mixture furfuryl alcohol with an aldehyde, and a mixture of furan resin and phenolic resin. Of these, furfuryl alcohol is preferred.

The furan-based consolidating fluid may be combined with a solvent to control viscosity if desired. Suitable solvents for use in the furan-based consolidation fluids of the present invention include, but are not limited to 2-butoxy ethanol, butyl acetate, and furfuryl acetate. Of these, 2-butoxy ethanol is preferred.

Where the low-viscosity consolidating fluid of the present invention is a phenolic-based consolidation fluid, suitable phenolic-based resins include, but are not limited to, terpolymers of phenol, phenolic formaldehyde resins, and a mixture of phenolic and furan resins. Of these, a mixture of phenolic and furan resins is preferred.

The phenolic-based consolidating fluid may be combined with a solvent to control viscosity if desired. Suitable solvents for use in the phenolic-based consolidation fluids of the present invention include, but are not limited to butyl acetate, butyl lactate, furfuryl acetate, and 2-butoxy ethanol. Of these, 2-butoxy ethanol is preferred.

Where the low-viscosity consolidating fluid of the present invention is an HT epoxy-based consolidation fluid, suitable HT epoxy-based components included, but are not limited to, bisphenol A-epichlorohydrin resin, polyepoxide resin, novolac resin, polyester resin, glycidyl ethers and mixtures thereof. Of these, bisphenol A-epichlorohydrin resin is preferred.

It is preferred that a solvent be used with the HT epoxy-based consolidation fluids of the present invention. Suitable solvents for use in the HT epoxy-based consolidation fluids of the present invention are those solvents capable of substantially dissolving the HT epoxy-resin chosen for use in the consolidation fluid. Such solvents include, but are not limited to, dimethyl sulfoxide and dimethyl formamide. Of these, dimethyl sulfoxide is preferred. A co-solvent such as dipropylene glycol methyl ether, dipropylene glycol dimethyl ether, dimethyl formamide, diethylene glycol methyl ether, ethylene glycol butyl ether, diethylene glycol butyl ether, propylene carbonate, d'limonene and fatty acid methyl esters, may also be used in combination with the solvent. Of these co-solvents, dipropylene glycol methyl ether is preferred.

Following the placement of the low-viscosity consolidating fluid into the subterranean formation, an after-flush fluid is placed into the subterranean formation to displace the low-viscosity consolidating fluid from the pore channels of the subterranean formation and to force the consolidating fluid and the water-resistant polymer further into the subterranean formation. The after-flush fluid is placed into the formation at a matrix flow rate such that the low-viscosity resin is displaced from the channels, but is not displaced from its desired location between the formation sand particles. Generally, the volume of after-flush fluid placed in the subterranean formation ranges from about 0.1 to about 50 times the volume of the low-viscosity resin. In some embodiments of the present invention, the volume of after-flush fluid placed in the subterranean formation ranges from about 2 to about 5 times the volume of the low-viscosity resin.

Optionally, a water-resistant polymer, as described above, may be added to the after-flush fluid. Where used, the water-resistant polymer is included in the after-flush fluid in an amount in the range of from about 0.01% to about 10.0% by weight of the aqueous liquid. In some embodiments of the present invention, the water-resistant polymer is included in the after-flush fluid in an amount of from about 0.1% to about 1.0% by weight of the aqueous liquid.

After the placement of the after-flush fluid, the subterranean formation may be shut in for a period of time to allow the resin in the consolidating fluid to cure to a desired unconfined compressive strength. The necessary period of time is dependent on the low-viscosity resin used, the temperature of the formation, and the unconfined compressive strength desired. Generally, the chosen period of time will be between about 0.5 hours and about 72 hours. In some embodiments of the present invention, the chosen period of time ranges between about 6 hours and about 48 hours. Determining the proper cure time is within the ability of one skilled in the art with the benefit of this disclosure.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of stabilizing a subterranean formation comprising the steps of:
    applying a preflush solution comprising an aqueous liquid and a water-resistant polymer to the subterranean formation;
    applying an aqueous liquid comprising a surfactant into the subterranean formation;
    applying a low-viscosity consolidating fluid to the subterranean formation; and,
    applying an afterflush fluid to the subterranean formation.

2. The method of claim 1 further comprising the step of waiting a chosen period of time after applying the afterflush fluid.

3. The method of claim 2 wherein the chosen period of time is from about 6 to about 48 hours.

4. The method of claim 1 wherein the consolidating fluid has a viscosity of below about 100 cP.

5. The method of claim 1 wherein the consolidating fluid comprises a hardenable resin component comprising a hardenable resin and a hardening agent component comprising a liquid hardening agent, a silane coupling agent, and a surfactant.

6. The method of claim 5 wherein the hardenable resin in the hardenable resin component is selected from the group consisting of: a bisphenol A-epichlorohydrin resin; a polyepoxide resin; a novolak resin; a polyester resin; a phenol-aldehyde resin; a urea-aldehyde resin; a furan resin; a urethane resin; a glycidyl ethers; or mixtures thereof.

7. The method of claim 5 further comprising a solvent for the hardenable resin in the hardenable resin component.

8. The method of claim 7 wherein the solvent for the hardenable resin in the hardenable resin component is selected from the group consisting of: butylglycidyl ether; dipropylene glycol methyl ether; dipropylene glycol dimethyl ether; dimethyl formamide; diethyleneglycol methyl ether; ethyleneglycol butyl ether; diethyleneglycol butyl ether; methanol propylene carbonate; d-limonene; a fatty acid methyl; or mixtures thereof.

9. The method of claim 5 wherein the liquid hardening agent in the hardening agent component is selected from the group consisting of: an amine; an aromatic amine; an aliphatic amine; a cyclo-aliphatic amine; piperidine; triethylamine; benzyldimethylamine; N,N-dimethylaminopyridine; 2-($N_2$N-dimethylaminomethyl)phenol, tris(dimethylaminomethyl)phenol; or mixtures thereof.

10. The method of claim 5 wherein the silane coupling agent in the hardening agent component is selected form the group consisting of: N-2-(aminoethyl)-3-aminopropyltrimethoxysilane; 3-glycidoxypropyltrimethoxysilane, n-beta-(aminoethyl)-gamma-aminopropyl trimethoxysilane; or mixtures thereof.

11. The method of claim 5 wherein the liquid hardening agent further comprises a hydrolyzable ester.

12. The method of claim 11 wherein the hydrolyzable ester is selected from the group consisting of: dimethylglutarate; dimethyladipate and dimethylsuccinate; sorbitol; catechol; dimethylthiolate; methyl salicylate; dimethyl salicylate; dimethylsuccinate; ter-butylhydroperoxide; or mixtures thereof.

13. The method of claim 5 wherein the surfactant in the hardening agent component is selected form the group consisting of: an ethoxylated nonyl phenol phosphate ester; a cationic surfactant; a $C_{12}$–$C_{22}$ alkyl phosphonate surfactant; a benzyl chloride quat of tris-2-4-6-dimethylaminomethyl phenol; one or more non-ionic surfactants and an alkyl phosphonate surfactant; or mixtures thereof.

14. The method of claim 5 wherein the liquid hardening agent further comprises a liquid carrier fluid.

15. The method of claim 14 wherein the liquid carrier fluid is selected from the group consisting of: dipropylene glycol methyl ether, dipropylene glycol dimethyl ether, dimethyl formamide; diethyleneglycol methyl ether; ethyleneglycol butyl ether; diethyleneglycol butyl ether; propylene carbonate; d-limonene; a fatty acid methyl ester; or mixtures thereof.

16. The method of claim 1 wherein the consolidating fluid comprises a furan-based resin.

17. The method of claim 16 wherein the furan-based resin is selected from the group consisting of: a furfuryl alcohol; a mixture of furfuryl alcohol with an aldehyde; a mixture of furan resin and phenolic resin; or mixtures thereof.

18. The method of claim 17 further comprising a solvent for the furan-based resin in the hardenable resin component.

19. The method of claim 18 wherein the solvent is selected from the group consisting of: 2-butoxy ethanol butyl acetate; furfuryl acetate; or mixtures thereof.

20. The method of claim 1 wherein the consolidating fluid comprises a phenolic-based resin.

21. The method of claim 20 wherein the phenolic-based resin is selected from the group consisting of: a terpolymer of phenol; a phenolic formaldehyde resin; a mixture of a phenolic resin and a furan resin; or mixtures thereof.

22. The method of claim 21 further comprising a solvent for the phenolic-based resin.

23. The method of claim 22 wherein the solvent is selected from the group consisting of: butyl acetate; butyl lactate; furfuryl acetate; 2-butoxy ethanol; or mixtures thereof.

24. The method of claim 1 wherein the consolidating fluid comprises a high-temperature epoxy-based resin and a solvent.

25. The method of claim 24 wherein the high-temperature epoxy-based resin is selected from the group consisting of: a bisphenol A-epichlorohydrin resin; a polyepoxide resin; a novolac resin; a polyester resin; a glycidyl ether; or mixtures thereof.

26. The method of claim 25 wherein the solvent is selected from the group consisting of: dimethyl sulfoxide; dimethyl formamide; dipropylene glycol methyl ether; dipropylene glycol dimethyl ether; diethylene glycol methyl ether; ethylene glycol butyl ether; diethylene glycol butyl ether; propylene carbonate; d-limonene; a fatty acid methyl ester; or mixtures thereof.

27. The method of claim 1 wherein the aqueous liquid in the preflush solution is selected from the group consisting of: salt water; a brine; or mixtures thereof.

28. The method of claim 1 wherein the water-resistant polymer is selected from the group consisting of: a polyacrylamide; a hydrolyzed polyacrylamide; xanthan; scleroglucan; a polysaccharide; an amphoteric polymer made from acrylamide, acrylic acid, and diallyldimethylammonium chloride; a vinyl sulfonate/vinyl amide/acrylamide terpolymer; a vinyl sulfonate/acrylamide copolymer; an acrylamide/acrylamido-methylpropanesulfonic acid copolymer; an acrylamide/vinylpyrrolidone copolymer; sodium carboxymethyl cellulose; poly[dialkylaminoacrylate-co-acrylate-graft-poly(ethyleneoxide)]; an acrylamide/octadecyldimethylammoniumethyl methacrylate bromide copolymer; a dimethylaminoethyl methacrylate/vinyl pyrrolidone/hexadecyldimethylammoniummethyl methacrylate bromide terpolymer; an acrylamide/2-acrylamido-2-methyl propane sulfonic acid/2-ethylhexyl methacrylate terpolymer; or mixtures thereof.

29. The method of claim 1 wherein the aqueous liquid comprising a surfactant is selected from the group consisting of: salt water; a brine; or mixtures thereof.

30. The method of claim 1 wherein the aqueous liquid comprising a surfactant is selected from the group consisting of: a ethoxylated nonyl phenol phosphate ester; a cationic surfactant; a non-ionic surfactant; an alkyl phosphonate surfactant; or mixtures thereof.

31. The method of claim 1 wherein the afterflush fluid is selected from the group consisting of: salt water; a brine; or mixtures thereof.

32. The method of claim 1 wherein the afterflush fluid further comprises a water-resistant polymer.

33. The method of claim 32 wherein the water-resistant polymer is selected from the group consisting of: a polyacrylamide; a hydrolyzed polyacrylamide; xanthan; scleroglucan; a polysaccharide; an amphoteric polymer made from acrylamide, acrylic acid, and diallyldimethylammonium chloride; a vinyl sulfonate/vinyl amide/acrylamide terpolymer; a vinyl sulfonate/acrylamide copolymer; an acrylamide/acrylamido-methylpropanesulfonic acid copolymer; an acrylamide/vinylpyrrolidone copolymer; sodium carboxymethyl cellulose; poly[dialkylaminoacrylate-co-acrylate-graft-poly(ethyleneoxide)]; an acrylamide/octadecyldimethylammoniumethyl methacrylate bromide copolymer; a dimethylaminoethyl methacrylate/vinyl pyrrolidone/hexadecyldimethylammoniummethyl methacrylate bromide terpolymer; an acrylamide/2-acrylamido-2-methyl propane sulfonic acid/2-ethylhexyl methacrylate terpolymer; or mixtures thereof.

* * * * *